US012585501B2

(12) United States Patent (10) Patent No.: US 12,585,501 B2
Narayanan et al. (45) Date of Patent: Mar. 24, 2026

(54) MACHINE-LEARNING (ML)-BASED RESOURCE UTILIZATION PREDICTION AND MANAGEMENT ENGINE

(71) Applicant: Bank of America Corporation, Charlotte, NC (US)

(72) Inventors: Gopal Narayanan, Tamil Nadu (IN); Paparayudu Anaparti, Telangana (IN); Vishnu Vardhan Sarva, Telangana (IN); Sai Karthik Nanduri, Telangana (IN); Saikiran Gunti, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 751 days.

(21) Appl. No.: 17/676,362

(22) Filed: Feb. 21, 2022

(65) Prior Publication Data

US 2023/0267009 A1 Aug. 24, 2023

(51) Int. Cl.
| | |
|---|---|
| *G06F 9/44* | (2018.01) |
| *G06F 9/50* | (2006.01) |
| *G06F 18/214* | (2023.01) |
| *G06N 20/00* | (2019.01) |
| *H04L 67/133* | (2022.01) |

(52) U.S. Cl.
CPC .......... *G06F 9/5044* (2013.01); *G06F 9/5016* (2013.01); *G06F 18/214* (2023.01); *G06N 20/00* (2019.01); *H04L 67/133* (2022.05); *G06F 2209/503* (2013.01); *G06F 2209/508* (2013.01)

(58) Field of Classification Search
CPC .... G06F 9/5044; G06F 9/5016; G06F 18/214; G06F 2209/503; G06F 2209/508; G06F 2209/501; G06F 9/4881; G06F 2209/5019; G06N 20/00; H04L 67/133
USPC ........................................................ 718/104
See application file for complete search history.

(56) References Cited

U.S. PATENT DOCUMENTS

| | | | |
|---|---|---|---|
| 6,895,292 B2 | 5/2005 | Fromherz et al. | |
| 7,230,736 B2 | 6/2007 | Fromherz | |
| 7,233,405 B2 | 6/2007 | Fromherz | |
| 8,621,472 B2 | 12/2013 | Longobardi et al. | |
| 9,342,349 B2 | 5/2016 | Nandyalam et al. | |
| 10,078,531 B2 * | 9/2018 | Feng ..................... | G06F 11/008 |
| 10,354,201 B1 * | 7/2019 | Roy ....................... | G06N 20/00 |
| 10,412,155 B2 | 9/2019 | Kumar et al. | |
| 10,831,633 B2 | 11/2020 | Hasija et al. | |
| 2021/0303985 A1 * | 9/2021 | Lakshmikantha ..... | G06N 3/044 |
| 2022/0012089 A1 * | 1/2022 | Nasr-Azadani .......... | G06N 5/04 |

FOREIGN PATENT DOCUMENTS

| | | | |
|---|---|---|---|
| CN | 110321222 | 5/2021 | |
| WO | WO-2019099281 A1 * | 5/2019 ............. | G06F 9/455 |

* cited by examiner

*Primary Examiner* — Timothy A Mudrick
(74) *Attorney, Agent, or Firm* — Weiss & Arons LLP

(57) ABSTRACT

Systems and methods for optimizing resource utilization in a computing system are provided. Methods include compiling training data, running a machine-learning (ML) model using the training data to determine a set of resource parameters, receiving a request to schedule the computing job on the computing system, computing, for each of a plurality of potential runtimes, an amalgam distance value, selecting the potential runtime with the optimal distance value for scheduling the computing job, and generating a job execution schedule based on the selected potential runtime.

18 Claims, 5 Drawing Sheets

200

220

204

I/O

206

PERIPHERAL DEVICES

202

CHIP MODULE

208

PROCESSOR

212

210

MEMORY

MACHINE-LEARNING (ML)-BASED RESOURCE UTILIZATION PREDICTION AND MANAGEMENT ENGINE

FIELD OF TECHNOLOGY

Aspects of the disclosure relate to computer systems. Specifically, aspects of the disclosure relate to apparatus and methods for optimizing resource utilization in a computer system.

BACKGROUND OF THE DISCLOSURE

Computer systems, especially computer systems that serve large entities, often have many computing jobs to execute. Computing jobs may, for example, include running programs or program segments, processing transactions, or transmitting communications.

Executing the jobs may utilize resources. Resources utilized by the computing system in executing the jobs may include processing power, electricity consumption, and memory usage. The resources available to the computing system may be finite.

Scheduling of job executions on the computing system may have a significant impact on the resource utilization and efficiency of the computing system. For example, some resources may be more available at certain times, and other resources may be more available at other times.

It would be desirable, therefore, to provide systems and methods for scheduling computing jobs on computing systems. It would be further desirable for the systems and methods to optimize the utilization of the resources available to the computing system.

SUMMARY OF THE DISCLOSURE

Aspects of the disclosure relate to systems and methods for a machine-learning (ML)-based engine for optimizing resource utilization in a computing system. The engine may include a processor and a non-transitory memory storing computer executable instructions. The computer executable instructions, when run on the processor, may be configured to execute some or all method steps and/or system functions.

The engine may be configured to compile training data. The training data may include historical resource utilization information. The engine may also be configured to run an ML model using the training data to determine a set of resource parameters. The resource parameters may be useful in predicting future resource utilization by a computing job on the computing system.

The engine may be configured to receive a request to schedule the computing job on the computing system. The engine may be configured to compute, for each of a plurality of potential runtimes, a distance value. The distance value may represent a measurement of predicted resource utilization by the computing job on the computing system at the potential runtime. The distance value may also be an amalgam measurement across the set of resource parameters.

The engine may be configured to select the potential runtime with the optimal distance value for scheduling the computing job. The engine may also be configured to generate a job execution schedule based on the selected potential runtime.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
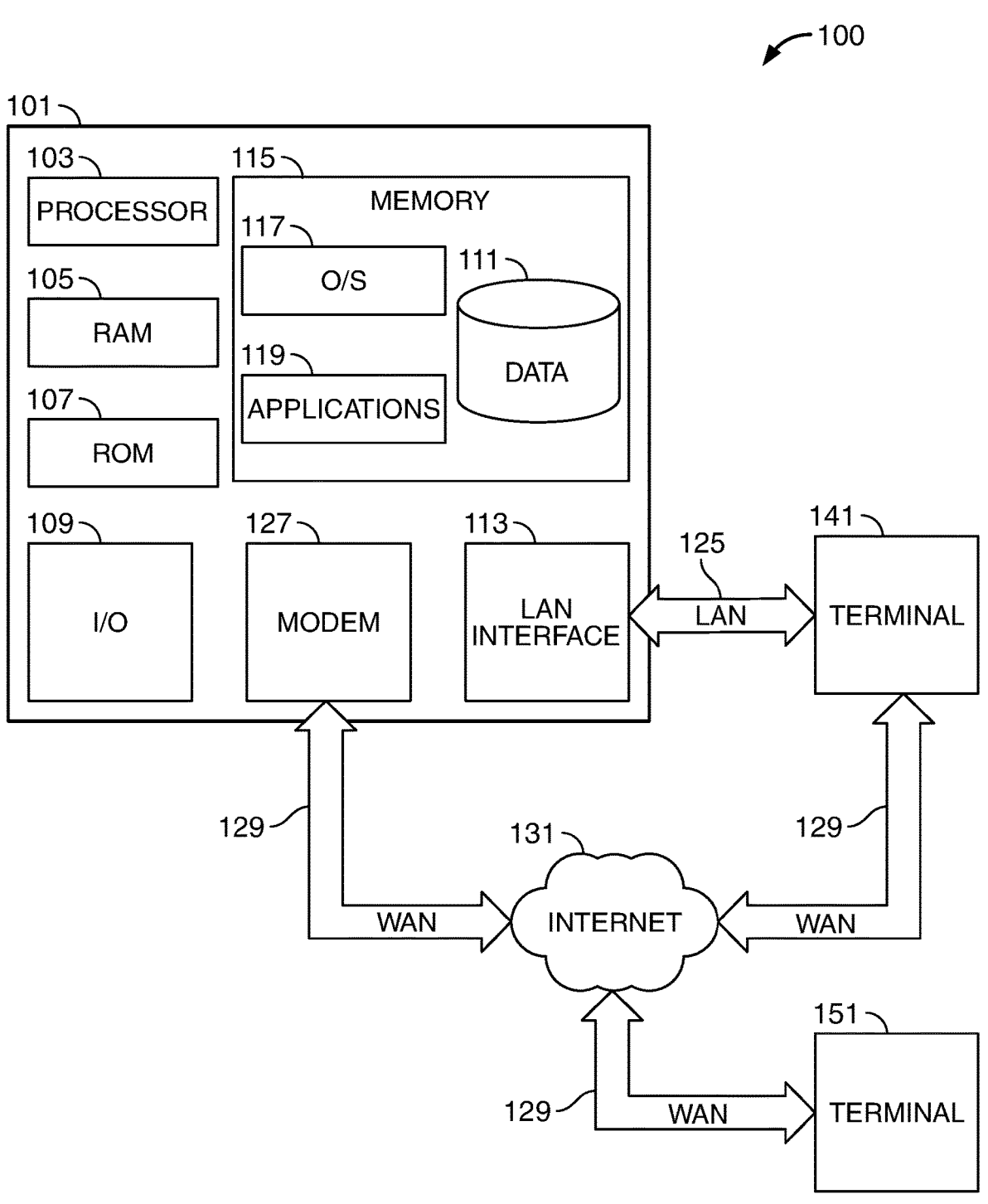
FIG. 1 shows an illustrative system in accordance with principles of the disclosure.

Aspects of the disclosure relate to systems and methods for a machine-learning (ML)-based engine for optimizing resource utilization in a computing system.

The engine may include a processor and a non-transitory memory storing computer executable instructions. The computer executable instructions, when run on the processor, may be configured to execute some or all method steps and/or system functions.

The engine may be configured to compile training data. The training data may include historical resource utilization information. The historical resource utilization information may include information relating to utilization of various resources during execution of computing jobs on a computing system. The historical resource utilization information may include information from a predetermined period of time. The time period may, in one example, be a six month period.

The engine may also be configured to run an ML model using the training data to determine a set of resource parameters. In certain embodiments, the set of resource parameters may be selected from a list including execution time, memory, processing power, remote procedure call (RPC) connection, number of files, and/or data volume.

The resource parameters may be useful in predicting future resource utilization by a computing job on the computing system. The ML model may, for example, determine which resource parameters are most relevant to use in calculating an overall resource utilization for particular jobs on particular systems. For example, training data may indicate that certain jobs may use very little of a certain resource, or certain computer systems may have an extremely large amount of a particular resource available at certain times. In these scenarios, the ML model may determine that the particular factor is not a significant factor in optimizing resource utilization, and should therefore not be a resource parameter used in future calculations.

In some embodiments, the engine may be further configured to run the ML model using the training data to determine a weighting multiplier for each resource parameter in the set of resource parameters for use in the computing of the distance values. For example, in addition to determining which resource parameters are to be used in the calculations, the ML model may determine a weighting (i.e., a coefficient by which a parameter is multiplied) for each resource parameter when some resource parameters are more important than others, and should weigh more in the calculation.

Using an ML engine as described, to determine which resource parameters to use and/or a weighting for those resource parameters, may allow the system to be platform neutral. In other words, because the ML model uses histori-cal data relevant to particular jobs on particular platforms, the ML model will be able to make the determination notwithstanding which particular platform is being ana-lyzed.

The engine may be configured to receive a request to schedule the computing job on the computing system. The engine may be configured to compute, for each of a plurality of potential runtimes, a distance value. The distance value may represent a measurement of predicted resource utiliza-tion by the computing job on the computing system at the potential runtime. The distance value may also be an amal-gam measurement across the set of resource parameters. In other words, the distance value may be a single value that incorporates a predicted overall resource utilization across multiple resource parameters.

The engine may be configured to select the potential runtime with the optimal distance value for scheduling the computing job. The optimal distance value may be the smallest value. The optimal distance value may, in some embodiments, be the largest value.

The engine may also be configured to generate a job execution schedule based on the selected potential runtime. The job execution schedule may involve scheduling multiple jobs at their respective selective potential runtimes. More-over, where multiple jobs are schedule for the same time, the system may compare the two and determine which one is more optimal at that time, and/or if either has an alternative time that is within a threshold degree of similar optimality, and schedule accordingly.

In certain embodiments, each resource parameter in the set of resource parameters may be associated with a dimen-sion. To compute each distance value, the engine may be further configured to assign each dimension a length, and to calculate a multidimensional Euclidean distance based on the lengths of the dimensions.

In certain embodiments, to assign each dimension a length, the engine may be further configured to receive a first input representing previous resource utilizations of the resource parameter associated with the dimension. The engine may also be configured to receive a second input representing a resource utilization requirement at the poten-tial runtime for the resource parameter associated with the dimension. The engine may be further configured to calcu-late a difference between the first input and the second input. The difference may be the length that is assigned to the dimension.

In some embodiments, to calculate the multidimensional Euclidean distance based on the lengths of the dimensions, the engine may be further configured to take a square root of a sum of the lengths of the dimensions.

In certain embodiments, the training data may include historical information about resource utilization across the set of resource parameters for computing jobs analogous to the computing job that were run on the computing system over a predetermined period of time.

In some embodiments, the engine may be further config-ured to present the plurality of potential runtimes along with the distance values of the potential runtimes on a display of a computing device associated with a system administrator. The engine may also be configured to receive a selection of a potential runtime from the system administrator via the computing device. The engine may be further configured to modify the job execution schedule based on the received selection.

In certain embodiments, the engine may be further con-figured to compute distance values for a plurality of com-puting platforms within the computing system.

Apparatus and methods described herein are illustrative. Apparatus and methods in accordance with this disclosure will now be described in connection with the figures, which form a part hereof. The figures show illustrative features of apparatus and method steps in accordance with the prin-ciples of this disclosure. It is understood that other embodi-ments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Ele-ments of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other compo-nents commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alterna-tively, some or all of computer executable instructions (alternatively referred to as "code") may be embodied in hardware or firmware (not shown). The computer 101 may execute the instructions embodied by the software to per-form various functions.

Input/output ("I/O") module may include connectivity to a microphone, keyboard, touch screen, mouse, and/or stylus through which a user of computer 101 may provide input. The input may include input relating to cursor movement. The input may relate to resource utilization predictions and scheduling associated with a computing job. The input/output module may also include one or more speakers for providing audio output and a video display device for providing textual, audio, audiovisual, and/or graphical out-put. The input and output may be related to computer application functionality. The input and output may be related to resource utilization predictions and scheduling associated with a computing job.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to resource utilization predictions and scheduling associated with a computing job.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
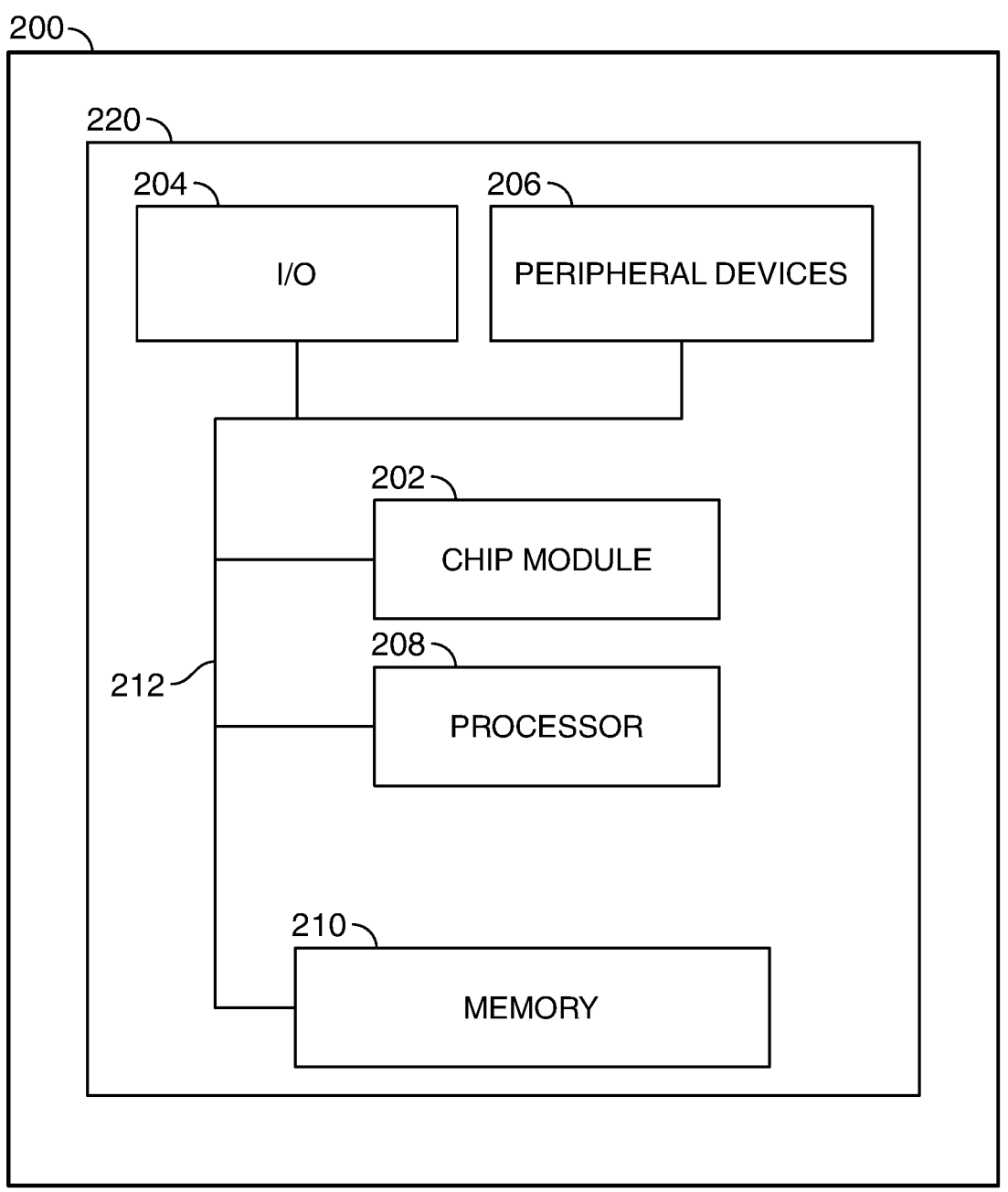
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
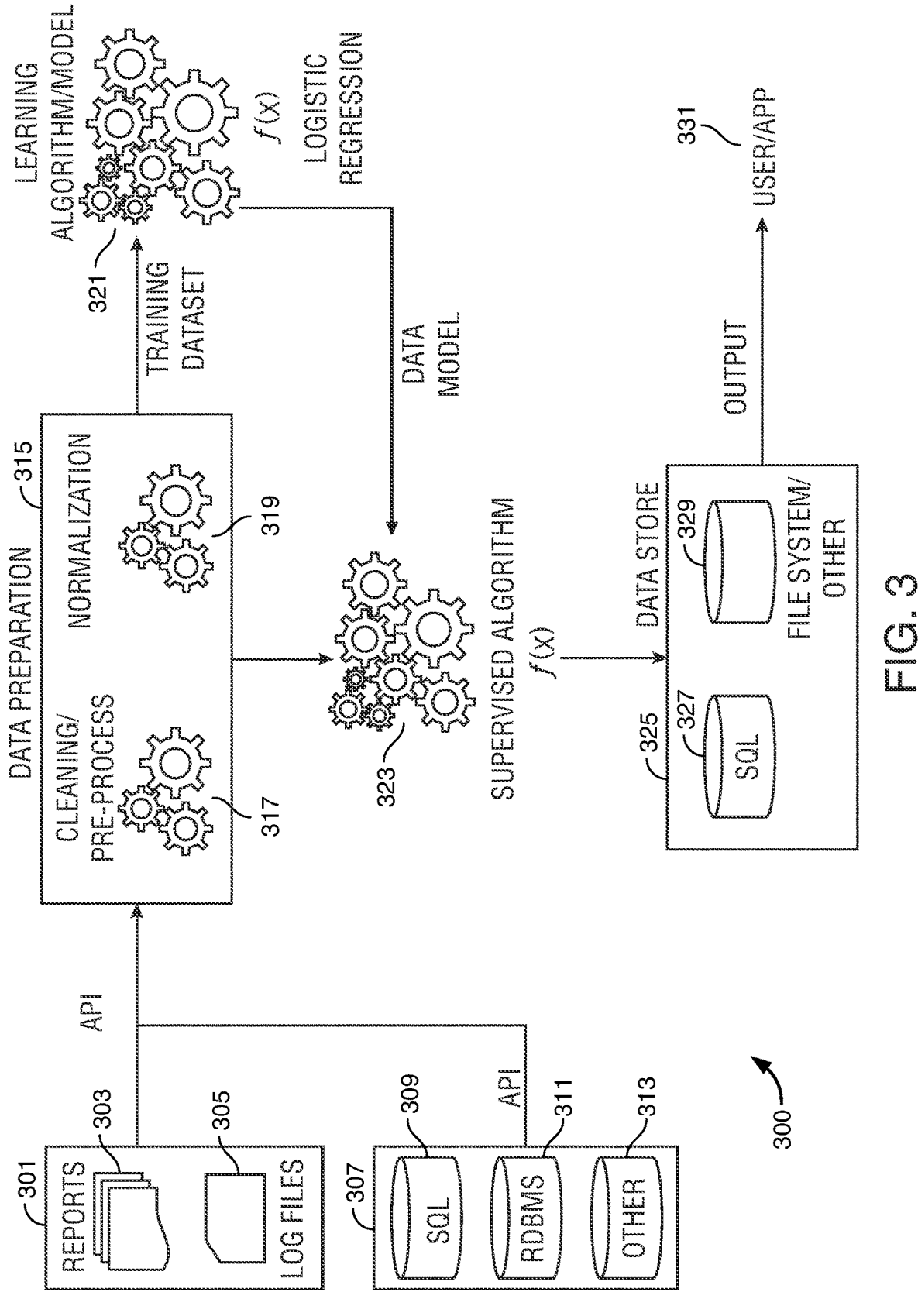
FIG. 3 shows an illustrative diagram in accordance with principles of the disclosure.

FIG. 3 shows illustrative diagram 300 that may be configured in accordance with the principles of the disclosure. Diagram 300 may show system components and processes for training and running ML models that may be part of predicting and scheduling computing jobs to optimize resource utilization in a computing system.

Diagram 300 may include training data 301 that may include reports 303 and log files 305. Diagram 300 may also include databases 307 that may include SQL database 309, a relational database management system (RDBMS) 311, and/or other database components 313.

Diagram 300 may include data preparation module 315. Data preparation module 315 may include cleaning/preprocessing component 317 and data normalization component 319. Data preparation module 315 may prepare training data 301 for use in predicting and scheduling computing jobs to optimize resource utilization.

Diagram 300 may include learning algorithm 321. Learning algorithm 321 may include one or more ML models that may be trained on training data 301 including, for example, a logistic regression. The algorithm may include a supervised component 323. Supervising the algorithm may include manually or, in some embodiments, automatically, refining and/or fine tuning the ML model to more accurately predict resource utilization of jobs on the system.

Diagram 300 may also include data store 325. Data store 325 may include a SQL database 327 and/or other system 329. Data store 325 may be associated with a computing system. The computing system may receive a request to schedule execution of a computing job. The system may use the refined algorithm to predict resource utilization of the job at various potential runtimes. The system may use the predictions to schedule a running of the job. The system may output the schedule to user application 331.

Figure 4:
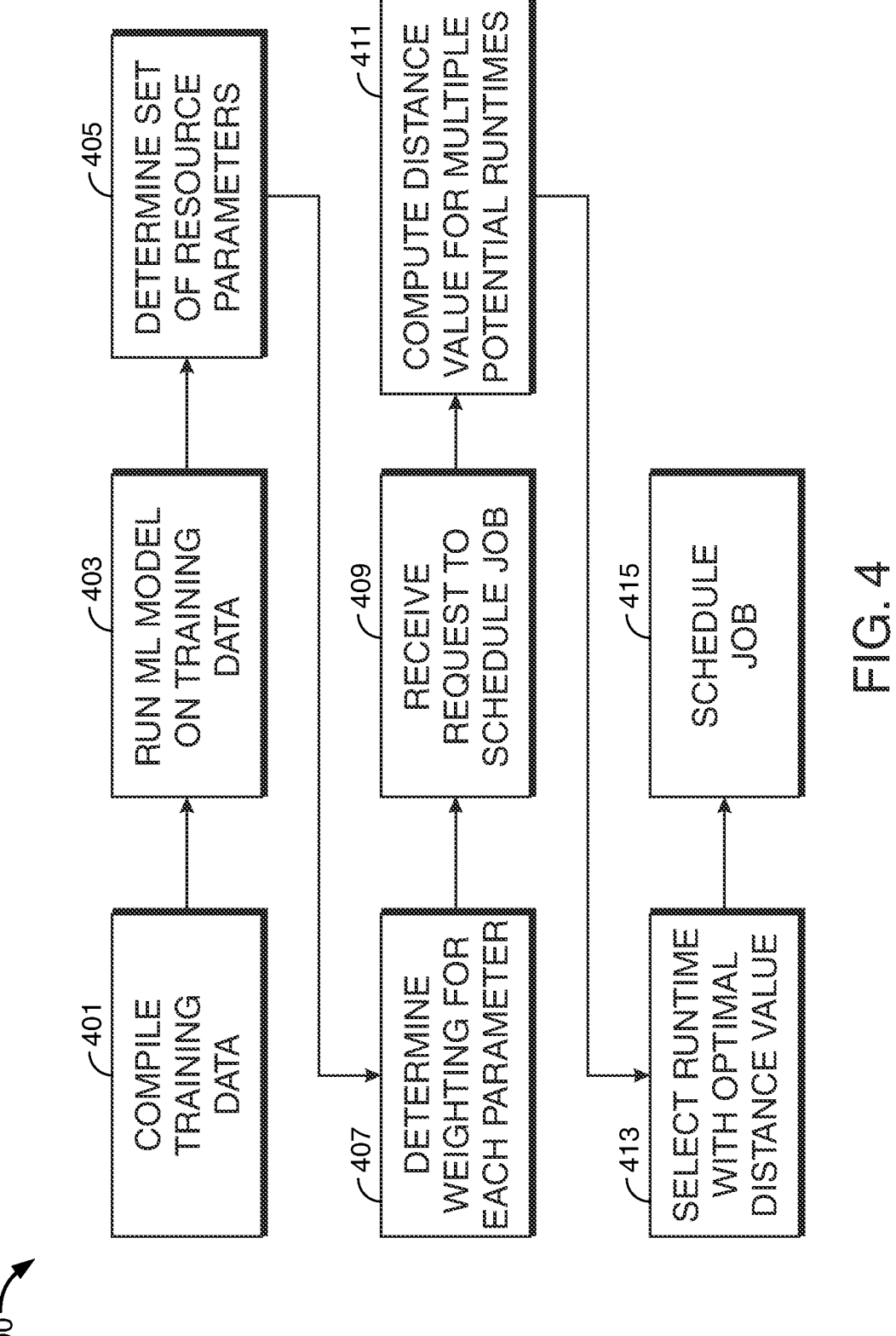
FIG. 4 shows an illustrative flowchart in accordance with principles of the disclosure.

FIG. 4 shows illustrative flowchart 400 in accordance with principles of the disclosure. Flowchart 400 begins with compiling training data at step 401. Step 403 includes running a machine-learning (ML) model on the training data. Based on the running of the ML model, step 405 includes determining a set of resource parameters and step 407 includes determining a weighting for each parameter. At step 409 the system receives a request to schedule a computing job. At step 411 the system computes a distance value for multiple potential runtimes for the computing job. The computation may be based, at least in part, on the resource parameters and the weightings determined at steps 405 and 407. Based on the computation, a runtime with an optimal distance value may be selected at step 413. Based on the selection, the job may be scheduled at step 415.

Figure 5:
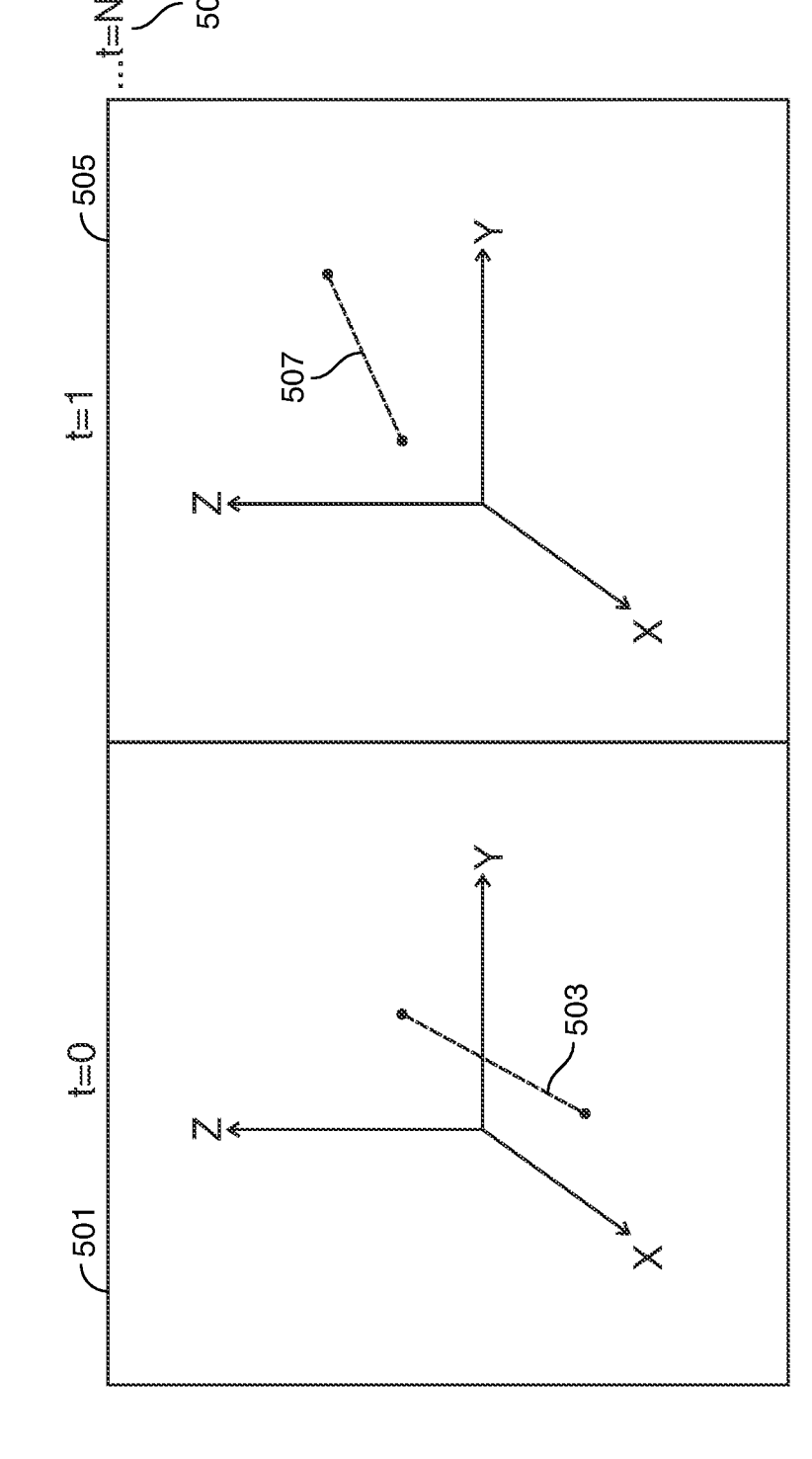
FIG. 5 shows an illustrative diagram in accordance with principles of the disclosure.

FIG. 5 shows illustrative diagram 500 in accordance with principles of the disclosure. Diagram 500 shows a graphical representation of distance values that may be calculated for multiple potential runtimes. Potential runtime 501 shows a 3-dimensional graph, with X, Y, and Z axes at time t=0. The three axes may represent three resource parameters, for example, CPU, memory, and RPC connection. Distance 503 may show a Cartesian distance between two three-dimensional coordinates on the graph.

Potential runtime 505 shows a 3-dimensional graph, with X, Y, and Z axes at time t=1. The three axes may represent the same three resource parameters as for potential runtime 501 (in this example, CPU, memory, and RPC connection). Distance 507 may show a Cartesian distance between two three-dimensional coordinates on the graph.

Distance values may be calculated for any number of potential runtimes 509, represented by t=N.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for machine-learning (ML)-based resource utilization prediction and management engines are provided. Persons skilled in the art will appreciate that the present invention can be practiced by other than the described embodiments, which are presented for purposes of illustration rather than of limitation, and that the present invention is limited only by the claims that follow.

What is claimed is:

1. A machine-learning (ML)-based engine for optimizing resource utilization in a computing system, said engine comprising:
   a processor;
   a non-transitory memory storing computer executable instructions that, when run on the processor, are configured to:
      compile training data, the training data comprising historical resource utilization information;
      run an ML model using the training data to determine a set of resource parameters that exceed a predetermined threshold impact level in predicting future resource utilization by a computing job on the computing system;
      receive a request to schedule the computing job on the computing system;
      compute, for each of a plurality of potential runtimes, a distance value, wherein the distance value:
         represents a measurement of predicted resource utilization by the computing job on the computing system at the potential runtime; and
         is a single value that represents the measurement of predicted resource utilization across the set of resource parameters;
      automatically select the potential runtime with the optimal distance value for scheduling the computing job; and
      generate a job execution schedule based on the selected potential runtime;
   wherein the engine is further configured to:
      present the plurality of potential runtimes along with the distance values of the potential runtimes on a display of a computing device associated with a system administrator, wherein the display shows a 3-dimensional rendering of the distance values for each of the plurality of potential runtimes;
      receive a selection of a potential runtime from the system administrator via the computing device; and
      modify the job execution schedule based on the received selection.

2. The engine of claim 1 wherein the set of resource parameters are selected from a list comprising execution time, memory, processing power, remote procedure call (RPC) connection, number of files, and data volume.

3. The engine of claim 1 further configured to run the ML model using the training data to determine a weighting multiplier for each resource parameter in the set of resource parameters for use in the computing of the distance values.

4. The engine of claim 1 wherein each resource parameter in the set of resource parameters is associated with a dimension, and, to compute each distance value, the engine is further configured to:
   assign each dimension a length; and
   calculate a multidimensional Euclidean distance based on the lengths of the dimensions.

5. The engine of claim 4 wherein, to assign each dimension a length, the engine is further configured to:

receive a first input representing previous resource utilizations of the resource parameter associated with the dimension;

receive a second input representing a resource utilization requirement at the potential runtime for the resource parameter associated with the dimension; and calculate a difference between the first input and the second input, wherein the difference is the length.

6. The engine of claim 4 wherein, to calculate the multidimensional Euclidean distance based on the lengths of the dimensions, the engine is further configured to take a square root of a sum of the lengths of the dimensions.

7. The engine of claim 1 wherein the training data comprises historical information about resource utilization across the set of resource parameters for computing jobs analogous to the computing job that were run on the computing system over a predetermined period of time.

8. The engine of claim 1 further configured to compute distance values for a plurality of computing platforms within the computing system.

9. A method for optimizing resource utilization in a computing system, the method comprising:

compiling training data, the training data comprising historical resource utilization information;

running a machine-learning (ML) model using the training data to determine a set of resource parameters that exceed a predetermined threshold impact level in predicting future resource utilization by a computing job on the computing system;

receiving a request to schedule the computing job on the computing system;

computing, for each of a plurality of potential runtimes, a distance value, wherein the distance value:

represents a measurement of predicted resource utilization by the computing job on the computing system at the potential runtime; and is a single value that represents the measurement of predicted resource utilization across the set of resource parameters;

automatically selecting the potential runtime with the optimal distance value for scheduling the computing job; and generating a job execution schedule based on the selected potential runtime;

wherein the method further comprises:

presenting the plurality of potential runtimes along with the distance values of the potential runtimes on a display of a computing device associated with a system administrator, wherein the display shows a 3-dimensional rendering of the distance values for each of the plurality of potential runtimes;

receiving a selection of a potential runtime from the system administrator via the computing device; and modifying the job execution schedule based on the received selection.

10. The method of claim 9 wherein the set of resource parameters are selected from a list comprising execution time, memory, processing power, remote procedure call (RPC) connection, number of files, and data volume.

11. The method of claim 9 further comprising running the ML model using the training data to determine a weighting multiplier for each resource parameter in the set of resource parameters for use in the computing of the distance values.

12. The method of claim 9 wherein each resource parameter in the set of resource parameters is associated with a dimension, and the computing of each distance value comprises:

assigning each dimension a length; and calculating a multidimensional Euclidean distance based on the lengths of the dimensions.

13. The method of claim 12 wherein the assigning each dimension a length comprises:

receiving a first input representing previous resource utilizations of the resource parameter associated with the dimension;

receiving a second input representing a resource utilization requirement at the potential runtime for the resource parameter associated with the dimension; and calculating a difference between the first input and the second input, wherein the difference is the length.

14. The method of claim 12 wherein the calculating the multidimensional Euclidean distance based on the lengths of the dimensions comprises taking a square root of a sum of the lengths of the dimensions.

15. The method of claim 9 wherein the training data comprises historical information about resource utilization across the set of resource parameters for computing jobs analogous to the computing job that were run on the computing system over a predetermined period of time.

16. The method of claim 9 further comprising computing distance values for a plurality of computing platforms within the computing system.

17. A machine-learning (ML) system with optimized resource utilization, said system comprising:

an ML model;

a processor;

a non-transitory memory storing computer executable instructions that, when run on the processor, are configured to:

compile training data, the training data comprising historical resource utilization information;

run the ML model using the training data to determine:

a set of resource parameters that exceed a predetermined threshold impact level in predicting future resource utilization by a computing job on the system, wherein the set of resource parameters are selected from a list comprising execution time, memory, processing power, remote procedure call (RPC) connection, number of files, and data volume; and a weighting multiplier for each resource parameter in the set of resource parameters;

receive a request to schedule the computing job on the system;

compute, for each of a plurality of potential runtimes, a distance value, wherein the distance value:

represents a measurement of predicted resource utilization by the computing job on the system at the potential runtime; and is a single value that represents the measurement of predicted resource utilization across the set of resource parameters, wherein the single value is computed using the weighting multipliers;

automatically select the potential runtime with the optimal distance value for scheduling the computing job; and generate a job execution schedule based on the selected potential runtime;

wherein the system is further configured to:

present the plurality of potential runtimes along with the distance values of the potential runtimes on a display of a computing device associated with a system administrator, wherein the display shows a 3-dimensional rendering of the distance values for each of the plurality of potential runtimes;

receive a selection of a potential runtime from the system administrator via the computing device; and modify the job execution schedule based on the received selection.

18. The system of claim 17 wherein each resource parameter in the set of resource parameters is associated with a dimension, and, to compute each distance value, the system is further configured to:

assign each dimension a length; and calculate a multidimensional Euclidean distance based on the lengths of the dimensions;

wherein:

to assign each dimension a length, the system is further configured to:

receive a first input representing previous resource utilizations of the resource parameter associated with the dimension;

receive a second input representing a resource utilization requirement at the potential runtime for the resource parameter associated with the dimension; and calculate a difference between the first input and the second input, wherein the difference is the length; and to calculate the multidimensional Euclidean distance based on the lengths of the dimensions, the system is further configured to take a square root of a sum of the lengths of the dimensions.

\* \* \* \* \*